United States Patent Office 2,719,810
Patented Oct. 4, 1955

2,719,810

1-ARYL DERIVATIVES OF 2-NITRO-1-TETRAHY-DRONAPHTHYLALKANES, AND INSECTICIDAL COMPOSITIONS CONTAINING THE SAME

Arnold N. Johnson, Paterson, N. J., assignor to Commercial Solvents Corporation, Terre Haute, Ind., a corporation of Maryland No Drawing. Application March 24, 1953,
Serial No. 344,472

15 Claims. (Cl. 167—32)

My invention relates to insecticidal compositions and is particularly concerned with materials adapted for combatting flies, the Mexican bean beetle, and other common insect pests. More particularly it relates to 1-aryl derivatives of 2-nitro-1-tetrahydronaphthylalkanes having the general formula:

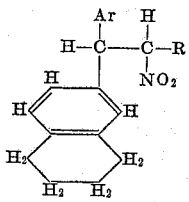

wherein R is an alkyl chain selected from the group consisting of methyl and ethyl and Ar is selected from the group consisting of chlorophenyl, p-ethylphenyl, p-isopropylphenyl, diethylphenyl, p-methoxyphenyl, tolyl, xylyl, 3,4-methylenedioxyphenyl, and 5,6,7,8-tetrahydro-2-naphthyl.

Nearly all of the practical insecticides now known to the art suffer from serious disadvantages, among the most serious of which is the fact that they are highly selective in their action. This means that the choice of an insecticide must be governed by the particular insect pest against which it is to be used. Even closely related insecticides have selective insecticidal properties which differ unpredictably, or are even totally dissimilar. Moreover, certain insects are virtually immune to all known insecticides, when applied in economically feasible quantities.

Further disadvantages frequently prevent an insecticidal agent with adequate killing properties from being used commercially. The agent may, for example, produce a discoloration of, or impart a taste to the infested vegetable or animal, thus rendering it unsuitable for market. Also, the agent may be difficult to apply or dangerous both during and after application. The cost of many insecticidal agents is also a prohibitive disadvantage. Another disadvantage directly related to that of high cost is that many agents must be applied in relatively strong concentrations. As a general rule it may be stated that the lower the required toxic concentration the lower the cost of using an insecticidal agent.

The efficacy of an insecticidal composition is most generally measured in terms of percent kill. It goes without saying that such measurement must be for a definite period of time, and that other conditions must be carefully controlled and standardized to permit comparison of results.

I have now discovered that compounds having the general formula:

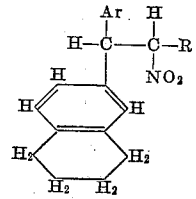

wherein R is selected from the group consisting of methyl and ethyl and Ar is selected from the group consisting of chlorophenyl, p-ethylphenyl, p-isopropylphenyl, diethylphenyl, p-methoxyphenyl, tolyl, xylyl, 3,4-methylenedioxyphenyl, and 5,6,7,8-tetrahydro-2-naphthyl possess strong insecticidal properties; and in particular that these compounds are especially effective agents for the Mexican bean beetle, housefly, the Southern army worm, and pea aphid. I have also discovered that not only do my compounds produce a high percent kill against a variety of insects but they also produce a high percent kill in such low concentrations as to make the use of my compounds economically desirable.

My invention comprises compounds resulting from the condensation reaction in the presence of concentrated sulfuric acid of 1,2,3,4-tetrahydronaphthalene (tetralin) with 2-nitro-1-propanols and 2-nitro-1-butanols carrying a substituted aryl group in the one position. Examples of my new compounds include: 2-nitro-1-(5,6,7,8-tetrahydro - 2 - naphthyl) - 1 - p - chlorophenylpropane, 2 - nitro - 1 - (5,6,7,8 - tetrahydro - 2 - naphthyl) - 1 - p-chlorophenylbutane, 2 - nitro - 1 - (5,6,7,8 - tetrahydro-2 - naphthyl) - 1 - p - ethylphenylpropane, 2 - nitro - 1-(5,6,7,8 - tetrahydro - 2 - naphthyl) - 1 - p - ethylphenylbutane, 2 - nitro - 1 - (5,6,7,8 - tetrahydro - 2 - naphthyl)-1 - p - isopropylphenylpropane, 2 - nitro - 1 - (5,6,7,8-tetrahydro - 2 - naphthyl) - 1 - p - isopropylphenylbutane, 2 - nitro - 1 - (5,6,7,8 - tetrahydro - 2 - naphthyl) - 1 - di-ethylphenylpropane, 2 - nitro - 1 - (5,6,7,8 - tetrahydro-2 - naphthyl) - 1 - diethylphenylbutane, 2 - nitro - 1 - (5,-6,7,8 - tetrahydro - 2 - naphthyl) - 1 - p - tolylpropane, 2 - nitro - 1 - (5,6,7,8 - tetrahydro - 2 - naphthyl) - 1 - p-tolylbutane, 2 - nitro - 1 - (5,6,7,8 - tetrahydro - 2 - naphthyl) - 1 - xylylpropane, 2 - nitro - 1 - (5,6,7,8 - tetrahydro - 2 - naphthyl) - 1 - xylylbutane, 2 - nitro - 1 - (5,-6,7,8 - tetrahydro - 2 - naphthyl) - 1 - p - methoxyphenylpropane, 2 - nitro - 1 - (5,6,7,8 - tetrahydro - 2 - naphthyl) - 1 - p - methoxyphenylbutane, 2 - nitro - 1 - (5,6,-7,8 - tetrahydro - 2 - naphthyl) - 1 - (3,4 - methylenedioxyphenyl)propane, 2 - nitro - 1 - (5,6,7,8 - tetrahydro - 2 - naphthyl) - 1 - (3,4 - methylenedioxyphenyl) butane, 2 - nitro - 1, 1 - bis(5,6,7,8 - tetrahydro - 2 - naphthyl) propane, 2 - nitro - 1,1 - bis(5,6,7,8 - tetrahydro-2 - naphthyl)butane.

Generally, in the preparation of my new compounds, I introduce a mixture of 1,2,3,4-tetrahydronaphthalene with the concentrated sulfuric acid condensation agent into a reaction vessel and then slowly add the desired 1-aryl-2-nitro-1-alkanol while agitating the mixture. I can mix the sulfuric acid with an inert solvent such as carbon tetrachloride and slowly add the 1,2,3,4-tetrahydronaphthalene and 1-aryl-2-nitro-1-alkanol as a mixture in order to suppress possible side reactions between the 1,2,3,4-tetrahydronaphthalene and sulfuric acid. I prefer this latter method of addition of the reactants. After the reaction is completed I allow the mixture to settle, separate the resulting layers, steam distill the top layer, and dry the residue to obtain my new product.

The sulfuric acid employed as a condensation agent can vary from about 80% to about 98% without appreciably affecting the yield of the desired product. The reaction will proceed at temperatures ranging from about 5° to about 50° C. However I prefer to conduct the reaction at from about 15° to about 30° C. to minimize side reactions.

As starting materials for my new compounds I can employ 1,2,3,4-tetrahydronaphthalene and any of the 2-nitro-1-aryl-1-alkanols having the general formula

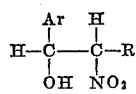

wherein R is methyl or ethyl and Ar is chlorophenyl, p-ethylphenyl, p-isopropylphenyl, diethylphenyl, p-methoxyphenyl, tolyl, xylyl, 3,4-methylenedioxyphenyl, or 5,6,7,8-tetrahydro-2-naphthyl, such as 2-nitro-1-chlorophenyl-1-propanol, 2-nitro-1-chlorophenyl-1-butanol, 2-nitro-1-p-ethylphenyl-1-propanol, 2-nitro-1-p-ethylphenyl-1-butanol, 2-nitro-1-p-isopropylphenyl-1-propanol, 2-nitro-1-p-isopropylphenyl-1-butanol, 2-nitro-1-diethylphenyl-1-propanol, 2-nitro-1-diethylphenyl-1-butanol, 2-nitro-1-tolyl-1-propanol, 2-nitro-1-tolyl-1-butanol, 2-nitro-1-xylyl-1-propanol, 2-nitro-1-xylyl-1-butanol, 2-nitro-1-p-methoxyphenyl-1-propanol, 2-nitro-1-p-methoxyphenyl-1-butanol, 2-nitro-1-(3,4-methylenedioxyphenyl)-1-propanol, 2-nitro-1-(3,4-methylenedioxyphenyl)-1-butanol, 2-nitro-1-(5,6,7,8-tetrahydro-2-naphthyl)-1-propanol, and 2-nitro-1-(5,6,7,8-tetrahydro-2-naphthyl)-1-butanol.

The 2-nitro-1-p-chlorophenyl-1-butanol used in producing my compounds can be prepared by condensing p-chlorobenzaldehyde with 1-nitropropane. A convenient method of effecting this condensation is as follows: A mixture of 3 moles of 1-nitropropane and 1 mole of p-chlorobenzaldehyde was agitated for 3 hours at 25° C. after the slow addition of 0.1 mole of 3.6 N alcoholic potassium hydroxide. The mixture was then acidified with 85% phosphoric acid, an emerald green color being an indication that the desired pH of 2 was obtained. Excess 1-nitropropane was then removed by steam distillation to a vapor temperature of 99° C., and the water layer separated from the product. If the pH is much above 2, appreciable benzaldehyde appears in the distillate and lowers the yield of 2-nitro-1-phenyl-1-butanol.

The 2-nitro-1-p-chlorophenyl-1-propanol can be prepared by the same procedure as that outlined above for 2-nitro-1-p-chlorophenyl-1-butanol except that nitroethane is substituted for the 1-nitropropane utilized in the first step.

The other 2-nitro-1-aryl-1-propanols and 2-nitro-1-aryl-1-butanols utilized as starting materials in producing my new compounds can also be prepared in the same manner as that outlined above for 2-nitro-1-p-chlorophenyl-1-butanol by making these changes in the procedure. To prepare 2-nitro-1-p-ethylphenyl-1-propanol and 2-nitro-1-p-ethylphenyl-1-butanol, p-ethylbenzaldehyde is substituted for the p-chlorobenzaldehyde used in the first step. To prepare 2-nitro-1-p-isopropylphenyl-1-propanol and 2-nitro-1-p-isopropylphenyl-1-butanol, p-isopropylbenzaldehyde is substituted for the p-chlorobenzaldehyde. To prepare 2-nitro-1-diethylphenyl-1-propanol and 2-nitro-1-diethylphenyl-1-butanol, diethylbenzaldehyde is substituted for the p-chlorobenzaldehyde. To prepare 2-nitro-1-tolyl-1-propanol and 2-nitro-1-tolyl-1-butanol, p-tolualdehyde or m-tolualdehyde is substituted for the p-chlorobenzaldehyde. To prepare 2-nitro-1-xylyl-1-propanol and 2-nitro-1-xylyl-1-butanol, 2,4-xylaldehyde is substituted for the p-chlorbenzaldehyde. To prepare 2-nitro-1-p-methoxyphenyl-1-propanol and 2-nitro-1-p-methoxyphenyl-1-butanol, p-methoxybenzaldehyde is substituted for p-chlorobenzaldehyde. To prepare 2-nitro-1-(3,4-methylenedioxyphenyl)-1-propanol and 2-nitro-1-(3,4-methylenedioxyphenyl)-1-butanol, 3,4-methylenedioxybenzaldehyde is substituted for the p-chlorobenzaldehyde. To prepare 2-nitro-1-(5,6,7,8-tetrahydro-2-naphthyl)-1-propanol and 2-nitro-1-(5,6,7,8-tetrahydro-2-naphthyl)-1-butanol, 5,6,7,8-tetrahydro-2-naphthaldehyde is substituted for the p-chlorobenzaldehyde.

The compounds of my invention are not uniformly toxic to different insects, although the propane and butane derivatives have approximately equal toxicities for the same kinds of insects. Thus, the least quantity of my compound which can be used effectively in insecticidal compositions depends primarily on the particular insect to be combatted. The required concentration also depends to some extent on such factors as the carrier used, method of application, location of insects and effect of the toxicant on host plants or animals. In general, however, compositions containing from about 1% to about 5% by weight in a liquid carrier give excellent results. For many common insect pests, concentrations much lower than 1% can be used. A 0.1% concentration of any one of my new compounds is sufficient to give a 100% kill when tested on Mexican bean beetles and pea aphids, insects against which many commonly used agricultural insecticides are ineffective. Concentrations as high as 5% may sometimes be desirable, but the toxic effects on the host plant or animal must be considered when using such concentrations.

Many different insecticidal carriers may be used for my new compounds. Effective concentrations can be produced in liquid carriers such as the lower aliphatic alcohols (methyl, ethyl, propyl, butyl), chlorinated hydrocarbons (carbon tetrachloride, dichloromethane, trichloroethane), and coal distillation solvents (benzene, xylene, toluene). Household kerosene can be used for the carrier or ultrasene, deodorized kerosene, can be substituted if the odor of kerosene is undesirable. Aqueous emulsions can be made and are advantageous in some cases.

As a solid vehicle, I can employ any of the forms of powdered aluminum silicate which are commonly employed in insecticidal compositions, such as pyrophyllite, bentonite, fuller's earth, kieselguhr, kaolin and talc. An excellent insecticidal powder is obtained by adsorbing 1% of 2-nitro-1,1-bis(5,6,7,8-tetrahydro-2-naphthyl)butane dissolved in acetone on fuller's earth, blending the dried mixture, and applying as a wettable powder.

In addition to either a liquid or solid carrier, other killing agents may be combined with my new compounds. In general, my compounds can be used in conjunction with killing agents such as pyrethrum, rotenone, derris extract, nicotine, and organic thiocyanates.

The following specific examples are offered to illustrate my invention and it is not intended that my invention be limited to the specific amounts and proportions set forth therein.

EXAMPLE I

In a 400-ml. beaker were mixed 102 gm. (0.772 mole) of 1,2,3,4-tetrahydronaphthalene and 100 ml. of 96% sulfuric acid. To this mixture was added over a 20 minute period 41.4 gm. (0.213 mole) of 2-nitro-1-p-tolyl-1-propanol, maintaining the temperature during the addition between 20° and 25° C. The resulting mixture was agitated for 1 hour then allowed to settle. The resulting two layers were separated and the top layer steam distilled. 49.5 gm. (.160 mole) of 2-nitro-1-p-tolyl-1-(5,6,7,8-tetrahydro-2-naphthyl)-propane was obtained upon drying the residue with benzene and under a vacuum. The 49.5 gm. of thick oily product represented a theoretical yield of 75.2%. Six grams of this crude product were recrystallized from petroleum hexane and again from ethanol producing 0.7 gm. of a white solid having a melting point of from 114° to 115° C. Analysis of this recrystallized product showed the percent of nitrogen contained to be 4.48% as against 4.52% calculated theoretically for the pure compound.

Insecticidal compositions containing the above crude product were formulated as emulsifiable solutions in xylene at the concentrations shown in Table I below. Houseflies were sprayed and retained in 14 mesh stainless steel cages. Dorsal and ventral surfaces of Wood Prolific lima beans were sprayed for 10 seconds each and offered to Southern army worm larvae, Mexican bean beetle larvae and pea aphids. The insecticidal compositions were applied with a Water's spray tower operated at 10 pounds per square inch and 10 seconds at the rate of 26 ml. discharge per minute. Table I below shows the percent kill obtained on the various insects using different dilutions of insecticides.

Table I 50 houseflies—24 hour test period.
10 Mexican bean beetle larvae—48 hour test period.
10 Southern army worm larvae—48 hour test period.
10 pea aphids—48 hour test period.

| Dilution, Percent | Percent Kill in Period | | | |
|---|---|---|---|---|
| | Housefly | Mexican Bean Beetle | Southern Army Worm | Pea Aphid |
| 1.0 | 100 | 100 | 20 | 100 |
| 0.1 | 70 | 100 | 10 | 100 |
| 0.05 | 8 | 100 | 10 | 100 |
| 0.01 | 2 | 60 | 0 | 70 |
| 0.005 | 0 | 90 | 30 | 90 |

EXAMPLE II

In a 400-ml. beaker were mixed 150 gm. (1.13 mole) of 1,2,3,4-tetrahydronaphthalene and 100 ml. of 96% sulfuric acid. To this mixture was added by dropwise addition over a 30 minute period 45.7 gm. (0.20 mole) of 2-nitro-1-p-chlorophenyl-1-butanol. The remaining mixture was agitated for 2½ hours and then allowed to settle overnight. The resulting layers were separated, the top layer washed and steam distilled. After drying with benzene and by vacuum the residue constituted 39.2 gm. (0.114 mole) of a viscous 2-nitro-1-p-chlorophenyl-1-(5,6,7,8-tetrahydro-2-naphthyl)butane which represented a yield of 57.2% of theoretical.

Insecticidal compositions containing the above product were then formulated and applied to houseflies, Mexican bean beetle larvae, Southern army worm larvae, and pea aphids in the manner described in Example I. The results are shown in Table II below.

Table II 50 houseflies—24 hour test period.
10 Mexican bean beetle larvae—48 hour test period.
10 Southern army worm larvae—48 hour test period.
10 pea aphids—48 hour test period.

| Dilution, Percent | Percent Kill in Period | | | |
|---|---|---|---|---|
| | Housefly | Mexican Bean Beetle | Southern Army Worm | Pea Aphid |
| 1.0 | 100 | 100 | 100 | 100 |
| 0.1 | 98 | 100 | 40 | 100 |
| 0.05 | 26 | 100 | 10 | 100 |
| 0.01 | 0 | 80 | 0 | 90 |
| 0.005 | 0 | 20 | 0 | 0 |

EXAMPLE III

A mixture of 100 ml. of 96% sulfuric acid in 200 ml. of carbon tetrachloride was placed in an 800-ml. beaker. To this mixture was added dropwise over a 16 minute period with agitation a mixture of 40.6 gm. (0.188 mole) of 2-nitro-1-p-chlorophenyl-1-propanol and 100 gm. (0.758 mole) of 1,2,3,4-tetrahydronaphthalene. Both reactants were added subsequently to the sulfuric acid in this manner to depress side reaction of the 1,2,3,4-tetrahydronaphthalene with the concentrated sulfuric acid. After additional agitation for one hour the resulting layers were separated, the top layer washed with water, and steam distilled. 42.2 gm. (0.128 mole) of 2-nitro-1-p-chlorophenyl-1 - (5,6,7,8 - tetrahydro - 2-naphthyl)propane was thereby obtained after benzene and vacuum drying of the residue which represented a yield of 68.2% of theoretical.

Insecticidal compositions containing the above product were then formulated and tested against houseflies, Southern army worm larvae, Mexican bean beetle larvae, and pea aphids in the manner described in Example I. The results are shown in Table III below.

Table III 50 houseflies—24 hour test period.
10 Mexican bean beetle larvae—48 hour test period.
10 Southern army worm larvae—48 hour test period.
10 pea aphids—48 hour test period.

| Dilution, Percent | Percent Kill in Period | | | |
|---|---|---|---|---|
| | Housefly | Mexican Bean Beetle | Southern Army Worm | Pea Aphid |
| 1.0 | 100 | 100 | 100 | 100 |
| 0.1 | 100 | 100 | 80 | 100 |
| 0.05 | 6 | 100 | 0 | 100 |
| 0.01 | 0 | 0 | 0 | 90 |
| 0.005 | 0 | 0 | 0 | 0 |

EXAMPLE IV

To a mixture of 50 ml. (0.426 mole) of 1,2,3,4-tetrahydronaphthalene and 50 ml. of 96% sulfuric acid in a 400-ml. beaker was added by dropwise addition holding the temperature below 20° C., 20.7 gm. (.099 mole) of 2-nitro-1-p-tolyl-1-butanol. The resulting mixture was agitated for an additional hour, allowed to settle, and steam distilled. After benzene and vacuum drying the residue constituted 24.1 gm. (.0745 mole) of 2-nitro-1-p-tolyl-1-(5,6,7,8-tetrahydro - 2 - naphthyl)butane representing a yield of 75.5 percent of theoretical.

Insecticidal compositions containing the above product were then formulated and applied to houseflies, Southern army worm larvae, Mexican bean beetle larvae, and pea aphids in the manner described in Example I. The results are shown in Table IV below.

Table IV 50 houseflies—24 hour test period.
10 Mexican bean beetle larvae—48 hour test period.
10 Southern army worm larvae—48 hour test period.
10 pea aphids—48 hour test period.

| Dilution, Percent | Percent Kill in Period | | | |
|---|---|---|---|---|
| | Housefly | Mexican Bean Beetle | Southern Army Worm | Pea Aphid |
| 1.0 | 100 | 100 | 100 | 100 |
| 0.1 | 98 | 100 | 80 | 100 |
| 0.05 | 80 | 100 | 10 | 100 |
| 0.01 | 4 | 100 | 0 | 100 |
| 0.005 | 4 | 100 | 0 | 30 |

EXAMPLE V

In a water cooled 400-ml. beaker were mixed 100 ml. of 85% sulfuric acid, 100 ml. of carbon tetrachloride, and 10 ml. of 1,2,3,4-tetrahydronaphthalene. To the resulting mixture was added by dropwise addition over a 20 minute period a mixture of 25 ml. of 1,2,3,4-tetrahydronaphthalene and 22.9 gm. (0.102 mole) of 2-nitro-1-p-methoxyphenyl-1-butanol. After an additional one hour of agitation the resulting mixture was allowed to settle, the layers separated and the top layer washed and steam distilled. After benzene and vacuum drying of the residue 15.4 gm. (.045 mole) of 2-nitro-1-p-methoxyphenyl-1-(5,6,7,8-tetrahydro-2-naphthyl)butane in the form of a brown viscous fingerprint-retaining product was obtained which represented a yield of 44.4% of the theoretical.

Insecticidal compositions containing the above product were then formulated and applied to houseflies, Southern army worm larvae, Mexican bean beetle larvae, and pea aphids in the manner described in Example I. The results are shown in Table V below.

*Table V*

50 houseflies—24 hour test period.
10 Mexican bean beetle larvae—48 hour test period.
10 Southern army worm larvae—48 hour test period.
10 pea aphids—48 hour test period.

| Dilution, Percent | Percent Kill in Period | | | |
|---|---|---|---|---|
| | Housefly | Mexican Bean Beetle | Southern Army Worm | Pea Aphid |
| 1.0 | 100 | 100 | 100 | 100 |
| 0.1 | 80 | 100 | 0 | 100 |

EXAMPLE VI

A mixture of 45.5 gm. (.190 mole) of 2-nitro-1-(3,4-methylenedioxyphenyl)-1-butanol and 62 ml. of 1,2,3,4-tetrahydronaphthalene was added by dropwise addition over a 20 minute period with agitation to a mixture of 100 ml. of 85% sulfuric acid, 100 ml. of carbon tetrachloride, and 20 ml. of 1,2,3,4-tetrahydronaphthalene. After addition of 200 ml. of carbon tetrachloride and 300 ml. of benzene, the resulting mixture was allowed to settle, the layers separated and the top layer steam distilled. After benzene and vacuum drying the residue constituted 15.9 gm. (.045 mole) of 2-nitro-1(3,4-methylenedioxyphenyl)-1-(5,6,7,8 - tetrahydro-2-naphthyl)butane which represented a yield of 23.7% theoretical.

Insecticidal compositions containing the above product were then formulated and applied to houseflies, Southern army worm larvae, Mexican bean beetle larvae, and pea aphids in the manner described in Example I. The results are shown in Table VI below.

*Table VI*

50 houseflies—24 hour test period.
10 Mexican bean beetle larvae—48 hour test period.
10 Southern army worm larvae—48 hour test period.
10 pea aphids—48 hour test period.

| Dilution, Percent | Percent Kill in Period | | | |
|---|---|---|---|---|
| | Housefly | Mexican Bean Beetle | Southern Army Worm | Pea Aphid |
| 1.0 | 100 | 100 | 100 | 100 |
| 0.1 | 76 | 100 | 50 | 90 |

EXAMPLE VII

To a mixture of 164.6 gm. of 85% sulfuric acid, 89.8 gm. of carbon tetrachloride, and 5.6 gm. of 1,2,3,4-tetrahydronaphthalene was added by dropwise addition a mixture of 22.8 gm. (0.092 mole) of 2-nitro-1-(5,6,7,8-tetrahydro-2-naphthyl)-1-butanol and 99.7 gm. of 1,2,3,4-tetrahydronaphthalene. The addition required one hour and the temperature was maintained between 25° and 30° C. The resulting mixture was agitated for an additional 1½ hours, allowed to settle, and the resulting layers separated. The top layer was washed with dilute sodium bicarbonate solution and steam distilled. After benzene and vacuum drying the residue constituted a product of 28.9 gm. (0.080 mole) of 2-nitro-1,1-bis (5,6,7,8-tetrahydro-2-naphthyl) butane in the form of a brown gum which represented a yield of 86.8% theoretical.

Insecticidal compositions containing the above product were then formulated and applied to houseflies, Southern army worm larvae, Mexican bean beetle larvae, and pea aphids in the manner described in Example I. The results are shown in Table VII below.

*Table VII*

50 houseflies—24 hour test period.
10 Mexican bean beetle larvae—48 hour test period.
10 Southern army worm larvae—48 hour test period.
10 pea aphids—48 hour test period.

| Dilution, Percent | Percent Kill in Period | | | |
|---|---|---|---|---|
| | Housefly | Mexican Bean Beetle | Southern Army Worm | Pea Aphid |
| 1.0 | 100 | 100 | 100 | 100 |
| 0.1 | 10 | 70 | 100 | 100 |

EXAMPLE VIII

A mixture of 22.6 gm. (0.10 mole) of 2-nitro-1-(p-ethylphenyl)-1-butanol and 50.0 gm. of 1,2,3,4-tetrahydronaphthalene was added by dropwise addition to a mixture of 100 ml. of 85% sulfuric acid, 100 ml. of carbon tetrachloride, and 10 ml. of 1,2,3,4-tetrahydronaphthalene. The addition required 20 minutes and the temperature was maintained between 18° and 22° C. The resulting mixture was agitated for one additional hour, allowed to settle, and the resulting layers separated. The top layer was washed with dilute sodium bicarbonate solution and steam distilled. The residue was dried with benzene to yield 21.2 gm. (0.063 mole) of 2-nitro-1-(p-ethylphenyl)-1-(5,6,7,8 - tetrahydro-2-naphthyl)butane in the form of a brown tar which represented a yield of 62.8% of theoretical.

Insecticidal compositions containing the above product were then formulated and applied to houseflies, Southern army worm larvae, Mexican bean beetle larvae, and pea aphids in the manner described in Example I. The results are shown in Table VIII below.

*Table VIII*

50 houseflies—24 hour test period.
10 Mexican bean beetle larvae—48 hour test period.
10 Southern army worm larvae—48 hour test period.
10 pea aphids—48 hour test period.

| Dilution, Percent | Percent Kill in Period | | | |
|---|---|---|---|---|
| | Housefly | Mexican Bean Beetle | Southern Army Worm | Pea Aphid |
| 1.0 | 100 | 100 | 100 | 100 |
| 0.1 | 72 | 90 | 90 | 100 |

EXAMPLE IX

A mixture of 35.2 gm. (0.148 mole) of 2-nitro-1-(p-isopropylphenyl)-1-butanol and 50 ml. of 1,2,3,4-tetrahydronaphthalene was added by dropwise addition to a mixture of 50 ml. of 96% sulfuric acid, 20 ml. of 1,2,3,4-tetrahydronaphthalene, and 100 ml. of chloroform in an 800-ml. water-cooled beaker. The addition required 40 minutes and the temperature was maintained between 20° and 30° C. The resulting mixture was agitated for one additional hour, allowed to settle, and the resulting layers separated. The top layer was washed with dilute sodium bicarbonate solution, and steam distilled. The residue from the steam distillation after drying by benzene and vacuum, constituted a product of 31.5 gm. (0.090 mole) of 2-nitro-1-(p-isopropylphenyl)-1-(5,6,7,8-tetrahydro-2-naphthyl)butane which represented a yield of 60.6% of theoretical.

Insecticidal compositions containing the above product were then formulated and applied to houseflies, Southern army worm larvae, Mexican bean beetle larvae, and pea aphids in the manner described in Example I. The results are shown in Table IX below.

Table IX 50 houseflies—24 hour test period.
10 Mexican bean beetle larvae—48 hour test period.
10 Southern army worm larvae—48 hour test period.
10 pea aphids—48 hour test period.

| Dilution, Percent | Percent Kill in Period | | | |
|---|---|---|---|---|
| | Housefly | Mexican Bean Beetle | Southern Army Worm | Pea Aphid |
| 1.0 | 100 | 100 | 100 | 100 |
| 0.1 | 50 | 100 | 100 | 100 |

EXAMPLE X

A mixture of 23.3 gm. (0.093 mole) of 2-nitro-1-(diethylphenyl)-1-butanol and 50.0 gm. of 1,2,3,4-tetrahydronaphthalene was added by dropwise addition to a mixture of 100 ml. of 85% sulfuric acid, 100 ml. of carbon tetrachloride, and 10.0 gm. of 1,2,3,4-tetrahydronaphthalene in a water-cooled beaker. The addition required 25 minutes and the temperature was maintained between 20° and 25° C. The resulting mixture was agitated for one additional hour, allowed to settle, and the resulting layers separated. The top layer was steam distilled and the residue dried with benzene and by vacuum. The dried residue constituted a product of 21.0 gm. (0.058 mole) of 2-nitro-1-(diethylphenyl)-1-(5,6,7,8-tetrahydro-2-naphthyl) butane which represented a yield of 62.4% of theoretical.

Insecticidal compositions containing the above product were then formulated and applied to houseflies, Southern army worm larvae, Mexican bean beetle larvae, and pea aphids in the manner described in Example I. The results are shown in Table X below.

Table X 50 houseflies—24 hour test period.
10 Mexican bean beetle larvae—48 hour test period.
10 Southern army worm larvae—48 hour test period.
10 pea aphids—48 hour test period.

| Dilution, Percent | Percent Kill in Period | | | |
|---|---|---|---|---|
| | Housefly | Mexican Bean Beetle | Southern Army Worm | Pea Aphid |
| 1.0 | 100 | 100 | 100 | 100 |
| 0.1 | 0 | 90 | 50 | 100 |

EXAMPLE XI

A mixture of 27.7 gm. (0.124 mole) of 2-nitro-1-xylyl-butanol and 40.0 gm. of 1,2,3,4-tetrahydronaphthalene was added by dropwise addition to a mixture of 100 ml. of 85% sulfuric acid, 100 ml. of carbon tetrachloride, and 33.4 gm. of 1,2,3,4-tetrahydronaphthalene. The addition required 20 minutes and the temperature was maintained between 20° and 25° C. The resulting mixture was agitated for an additional one-half hour, allowed to settle, and the resulting layers separated. The top layer was washed with dilute sodium bicarbonate solution and steam distilled. The residue was dried with benzene to yield 32.0 gm. (0.095 mole) of 2-nitro-1-xylyl-1-(5,6,7,8-tetrahydro-2-naphthyl)butane which represented a yield of 76.4% of theoretical.

Insecticidal compositions containing the above product were then formulated and applied to houseflies, Southern army worm larvae, Mexican bean beetle larvae and pea aphids in the manner described in Example I above. The results are shown in Table XI below.

Table XI 50 houseflies—24 hour test period.
10 Mexican bean beetle larvae—48 hour test period.
10 Southern army worm larvae—48 hour test period.
10 pea aphids—48 hour test period.

| Dilution, Percent | Percent Kill in Period | | | |
|---|---|---|---|---|
| | Housefly | Mexican Bean Beetle | Southern Army Worm | Pea Aphid |
| 1.0 | 100 | 100 | 100 | 100 |
| 0.1 | 78 | 100 | 90 | 100 |

While the above examples describe the preferred embodiments of my invention, it will be understood that departures therefrom may be made within the scope of the specification and claims. In general it may be said that any modifications or equivalents that would ordinarily occur to those skilled in the art are to be considered as lying within the scope of my invention.

Now having disclosed my invention what I claim is:

1. The compounds represented by the formula

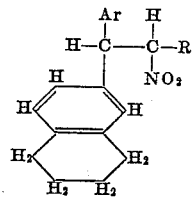

wherein R is selected from the group consisting of methyl and ethyl and Ar is selected from the group consisting of chlorophenyl, p-ethylphenyl, p-isopropylphenyl, diethylphenyl, tolyl, xylyl, and 5,6,7,8-tetrahydro-2-naphthyl.

2. 2 - nitro - 1 - tolyl - 1 - (5,6,7,8 - tetrahydro - 2-naphthyl)butane.

3. 2-nitro-1-p - chlorophenyl-1 - (5,6,7,8 - tetrahydro - 2-naphthyl)propane.

4. 2-nitro-1-(p-ethylphenyl)-1 - (5,6,7,8 - tetrahydro - 2-naphthyl)butane.

5. 2-nitro-1-(p-isopropylphenyl)-1-(5,6,7,8-tetrahydro-2-naphthyl)butane.

6. 2-nitro,1,1-bis(5,6,7,8-tetrahydro-2-naphthyl)butane.

7. An insecticidal composition containing as the active insecticidal component thereof a compound represented by the formula

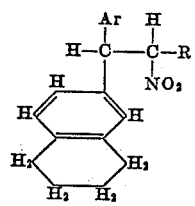

wherein R is selected from the group consisting of methyl and ethyl and Ar is selected from the group consisting of chlorophenyl, p-ethylphenyl, p-isopropylphenyl, diethylphenyl, tolyl, xylyl, and 5,6,7,8-tetrahydro-2-naphthyl.

8. The composition of claim 7 wherein the active insecticidal component thereof is dispersed in a liquid petroleum distillate as a carrier.

9. The composition of claim 7 wherein the active insecticidal component thereof is dispersed in a liquid coal tar hydrocarbon as a carrier.

10. The composition of claim 7 wherein the active insecticidal component thereof is contained in a ground aluminum silicate as a carrier.

11. An insecticidal composition containing as the active insecticidal component thereof, from 0.005% to 5% 2-nitro-1-p-tolyl-1-(5,6,7,8-tetrahydro-2-naphthyl)butane.

12. An insecticidal composition containing as the active insecticidal component thereof, from 0.005% to 5% 2-nitro-1-p-chlorophenyl-1-(5,6,7,8-tetrahydro-2-naphthyl)propane.

13. An insecticidal composition containing as the active insecticidal component thereof, from 0.005% to 5% 2-nitro-1-(p-ethylphenyl)-1-(5,6,7,8-tetrahydro-2-naphthyl)butane.

14. An insecticidal composition containing as the active insecticidal component thereof, from 0.005% to 5% 2-nitro-1-(p-isopropylphenyl)-1-(5,6,7,8-tetrahydro-2-naphthyl)butane.

15. An insecticidal composition containing as the active insecticidal component thereof, from 0.005% to 5% 2-nitro-1,1-bis(5,6,7,8-tetrahydro-2-naphthyl)butane.

References Cited in the file of this patent

UNITED STATES PATENTS

| | | |
|---|---|---|
| 2,516,186 | Hass | July 25, 1950 |
| 2,538,687 | Hass et al. | Jan. 16, 1951 |
| 2,578,736 | Pijoan et al. | Dec. 18, 1951 |